United States Patent [19]

Hironaga et al.

[11] Patent Number: 4,516,432

[45] Date of Patent: May 14, 1985

[54] APPARATUS FOR MEASURING TWO-PHASE FLOW

[75] Inventors: Katsuji Hironaga, Kawanishi; Tadaki Nishiura, Takatsuki, both of Japan

[73] Assignee: Nihon Kagaku Kogyo Co., Ltd., Osaka, Japan

[21] Appl. No.: 541,793

[22] Filed: Oct. 13, 1983

[51] Int. Cl.³ .............................................. G01F 1/74
[52] U.S. Cl. ................................. 73/861.04; 250/574; 356/28.5
[58] Field of Search ............... 73/861, 861.04, 861.25; 250/573, 574, 577; 356/28.5, 133, 135, 136

[56] References Cited

U.S. PATENT DOCUMENTS 4,320,665  3/1982  Cain ................................... 73/861.04
4,372,165  2/1983  Pitt et al. ............................ 356/133

FOREIGN PATENT DOCUMENTS 142606  7/1980  German Democratic Rep. ................................. 73/861.04
1597340  9/1981  United Kingdom ............ 73/861.04

Primary Examiner—Herbert Goldstein
Attorney, Agent, or Firm—Lowe King Price & Becker

[57] ABSTRACT

An apparatus for measuring liquid-gas two-phase flow comprises a light source, an optical fiber with the end face disposed perpendicularly to the flow direction of the two-phase flow, and a photo detector which detects the reflected light. When a bubble approaches toward the end face of the fiber and the center thereof pass through it, the light reflected by the bubble is shifted by the Doppler effect and the light intensity reflected by the end face of the fiber changes corresponding to the difference of the refraction indices of the liquid and gas, so that the photo detector generates electric signal from light beat of these reflected light beams. And bubble velocity and its diameter can be simultaneously measured by high and low frequency components of this signal, respectively.

8 Claims, 15 Drawing Figures

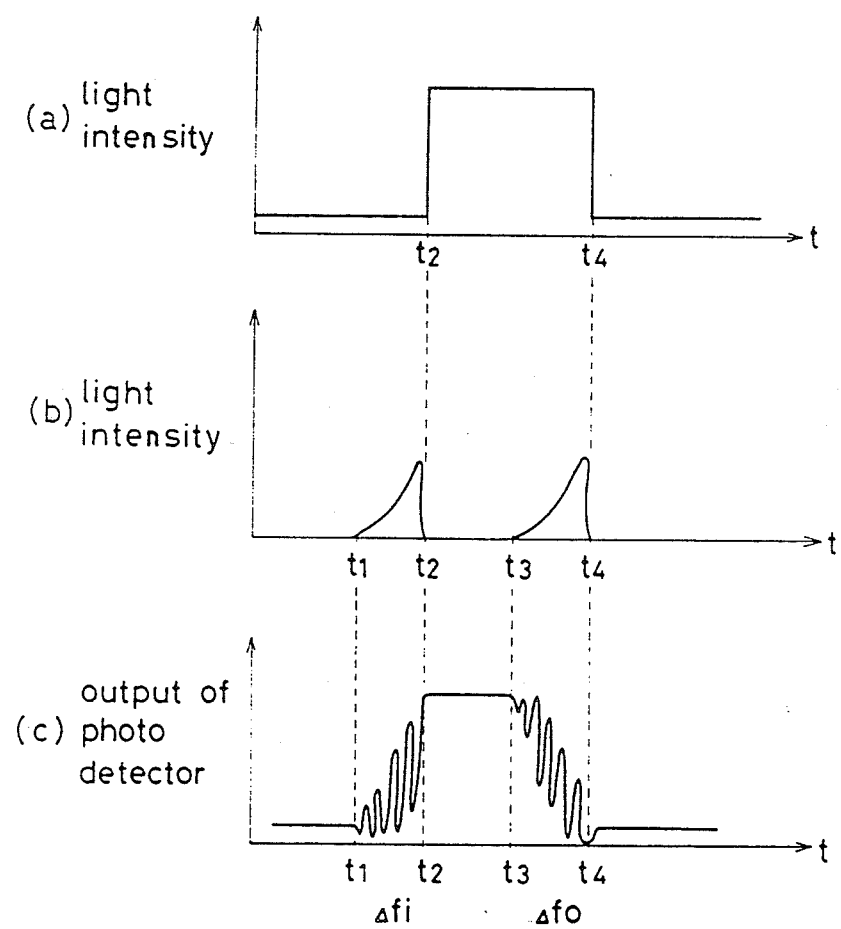

APPARATUS FOR MEASURING TWO-PHASE FLOW

BACKGROUND OF THE INVENTION

(1) Field of the Invention

The present invention relates to an apparatus for measuring bubble or drop velocity and its diameter etc. in liquid-gas two-phase flow simultaneously.

(2) Prior Art

Several type of apparatuses for measuring bubble velocity and its diameter in liquid-gas two-phase flow have already been proposed. One of them is an apparatus for measuring changes of electric resistance in the two-phase flow. The apparatus has a sensing part which comprises a pair electrodes. They consist of a minute point electrode provided at the point of a needle like metal line coated by an insulator, and a fine metal duct wrapping the coated metal line except the point part. A predetermined voltage is applied across the pair of electrodes, and the sensing part is placed in the liquid-gas two-phase flow. In case the sensing part is in a liquid phase, the resistance between the two electrodes becomes a specified value determined by the nature of the liquid. But if the point electrode is in a gas phase, the two electrodes are almost insulated, that is to say the resistance becomes an extremely large value. Therefore, the state of the liquid-gas two-phase flow can be measured by detecting the change of the resistance value of the flow. However, the method of this type is effective only when the liquid is conductive. And if the liquid is non-conductive liquid, such as oil or alchol, the flow containing such liquid cannot be measured since the electrodes of the sensing part are always insulated from each other. But, even if the liquid is conductive, in case there is a possibility that chemical change occurs in the liquid by current flow arising from voltage application, it is improper to measure the two-phase flow by this conventional appratus.

Another conventional measuring apparatus has an optical fiber bent to an U-shaped and taken off its coating as a sensing part. Light is guided into one end of the optical fiber placed in the liquid-gas two-phase flow. When the sensing part is in the liquid phase, a part of the fed light leaks into the liquid since the difference between the refraction indices of the liquid and the fiber (glass) is very small, and thus the output light intensity from the other end of the optical fiber decreases. On the other hand, when the sensing part is in the gas phase, namely it is in a bubble, the fed light does not leak to the bubble since the light is totally reflected by the boundary face of the fiber and the bubble, and thus the output light intensity from the other end of the fiber does not decrease. Therefore, the liquid-gas two-phase flow can be measured by detecting the change of the output light intensity. However, in this method, it is very difficult to minimize the sensing part because the sensing part is the U-shaped fiber. Accordingly this measuring apparatus can not detect small bubbles, and high measuring reliability cannot be expected.

SUMMARY OF THE INVENTION

The present invention improves such disadvantages of the conventional apparatuses as mentioned above, and provides an apparatus for precisely measuring bubble or drop velocity and its diameter in liquid-gas two-phase flow without regard for the physical properties of liquid or bubble diameter.

BRIEF DESCRIPTION OF THE DRAWINGS

FIGS. 2(a) and 2(b) are graphs showing intensities of light reflected from an end face of the optical fiber and the surface of the bubble, respectively.

FIG. 2(c) is a graph showing wave form of the output signal of a photo detector 8.

DESCRIPTION OF THE PREFERRED EMBODIMENT

The present invention relates to an apparatus for measuring liquid-gas two-phase flow using an optical fiber as a sensing part. The apparatus of the present invention comprises a light source for generating light which has a single oscillation frequency and a specified plane of polarization, a polarization beam splitter for passing the applied light from the light source, an optical fiber with two end faces, the light passing through the polarization beam splitter being applied to one of the end faces, and the other end face being placed in the liquid-gas two-phase flow, a photo detector for receiving reflected light by the polarization beam splitter out of the light reflected by the other end face of the optical fiber and the light reflected by a boundary face of the liquid-gas two-phase flow, a velocity detecting means for detecting bubble velocity from a high frequency component of an output signal of the photo detector, and a transit time detecting means for detecting bubble transit time from a low frequency component of the output signal of the photo detector.

Figure 1A:
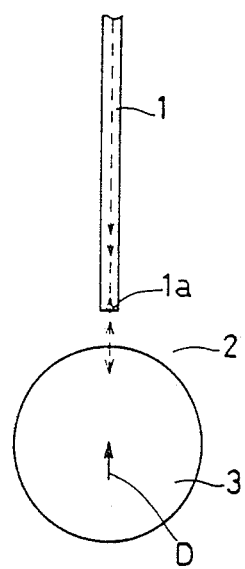
FIGS. 1(a) to 1(c) are schematic views showing positional relations between a bubble and an optical fiber and illustrating the principle of the present invention.
Figure 1B:
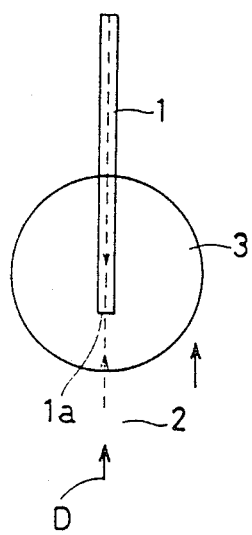
Figure 1C:
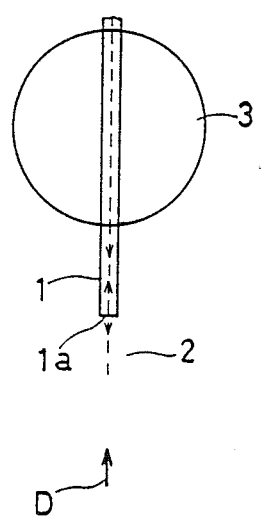

The principle of the present invention will be described below referring to FIGS. 1(a)–1(c). In these figures, an optical fiber 1 is placed in the liquid-gas two-phase flow, and is fixed so that its end face 1a perpendicularly confronts the two-phase flow. The numerals 2 and 3 indicate a liquid phase and a bubble, respectively, and arrows D illustrated by the solid lines indicate the direction of the two-phase flow. FIG. 1(a) shows a state that the end face 1a of the optical fiber 1 faces to the approaching bubble 3, FIG. 1(b) shows a state that the end face 1a penetrates into the bubble 3, and FIG. 1(c) shows a state that the bubble 3 has passed through the end face 1a of the optical fiber 1. In these figures, arrows illustrated by the dotted line will indicate the direction of light.

In case light is fed to the optical fiber 1 from a light source (not shown), almost all of the light pass through the end face 1a, but the rest of the light is reflected at the end face 1a and returns to the side of the light source, and the reflected light intensity depends on the refraction index of a medium that the end face 1a is in contact with. If the reflection index $n_c$ of the core part of the optical fiber 1 is 1.5, the reflection index $n_l$ of the liquid phase, e.g. water is 1.3, and the reflection index $n_a$ of the gas phase, e.g. air is 1.0, then the reflected light intensity amounts to 0.5% in a state that the end face 1a of the optical fiber 1 is in contact with the liquid phase as shown in FIGS. 1(a) and 1(c), and that amounts to 4% in a state that the end face 1a is in contact with the gas phase as shown in FIG. 1(b). Therefore, in case the bubble 3 approaches toward the end face 1a, then contacts and passes through the fiber 1 as shown in FIGS. 1(a) to 1(c), the intensity of the light reflected by the end face 1a changes as shown in FIG. 2(a). Where, time $t_2$ designates a time when the bubble 3 contacts the end face 1a, and time $t_4$ designates a time when the end face 1a finishes to penetrate the bubble 3 and faces to the liquid phase again. As seen from FIG. 2(a), the light intensity is high during the time period between time $t_2$ and $t_4$ since the end face 1a contacts the gas phase.

Now, in FIGS. 1(a) and 1(b), the light passing through the end face 1a of the optical fiber 1 is reflected at the boundary face of the two-phase, namely at the outer and inner surface of the bubble 3, and is put again into the optical fiber 1 through the end face 1a. Since the bubble 3 approaches toward the end face 1a in the direction designated by the arrows D at a velocity of V, the frequency of the light reflected by the bubble 3 slightly rises because of the Doppler effect. If the frequency of the incident light from the light source is designated as $f_i$, the frequency shift $\Delta f_i$ arising from the Doppler effect when the bubble 3 approaches toward the end face 1a is given as follows;

$$\Delta f_i = \left( \frac{c/n_1 + V}{c/n_1 - V} - 1 \right) f_i = \frac{2n_1 V}{c} \cdot f_i = \frac{2n_1 V}{\lambda}, \quad (1)$$

where c is light velocity.

And the Doppler shift frequency $\Delta f_o$ arising from the Doppler effect just before the bubble 3 finishes to pass through the end face 1a is given as follows like Equation (1);

$$\Delta f_o = 2 n_a V / \lambda \quad (2)$$

Since, the frequency of the reflected light from the end face 1a is equal to the frequency $f_i$ of the light from the light source, the Doppler shift frequencies can be detected by light beat of the light reflected by the end face 1a and the bubble 3. FIG. 2(b) shows momentarily changing intensity of the light reflected by the bubble surface, and the time axis coincides with that of FIG. 2(a). As shown in this figure, the reflected light can be obtained from the bubble surface, namely the boundary face of the two-phase, during a first period between a time $t_1$ when the bubble 3 approaches toward the end face 1a and just before contacting it and a time $t_2$ when the bubble 3 actually contacts it, as well as a second period between a time $t_3$ when the end face 1a penetrates the bubble 3 and just before the bubble 3 finishes to pass through the end face 1a, and a time $t_4$ when the bubble 3 finishes to pass it. Since the frequencies of the reflected light are shifted by the Doppler effect, the Doppler shift frequency can be measured by a heterodyne detection using the light reflected by the end face 1a as a reference light, and thus the velocity of the bubble 3 can be measured by Equations (1) and (2). Furthermore, a transit time of the bubble 3 can also be measured by detecting time interval between $t_2$ and $t_4$, as shown in FIGS. 2(a) and 2(b). In addition, the bubble diameter can be measured by the velocity and the transit time of the bubble 3.

Figure 3:
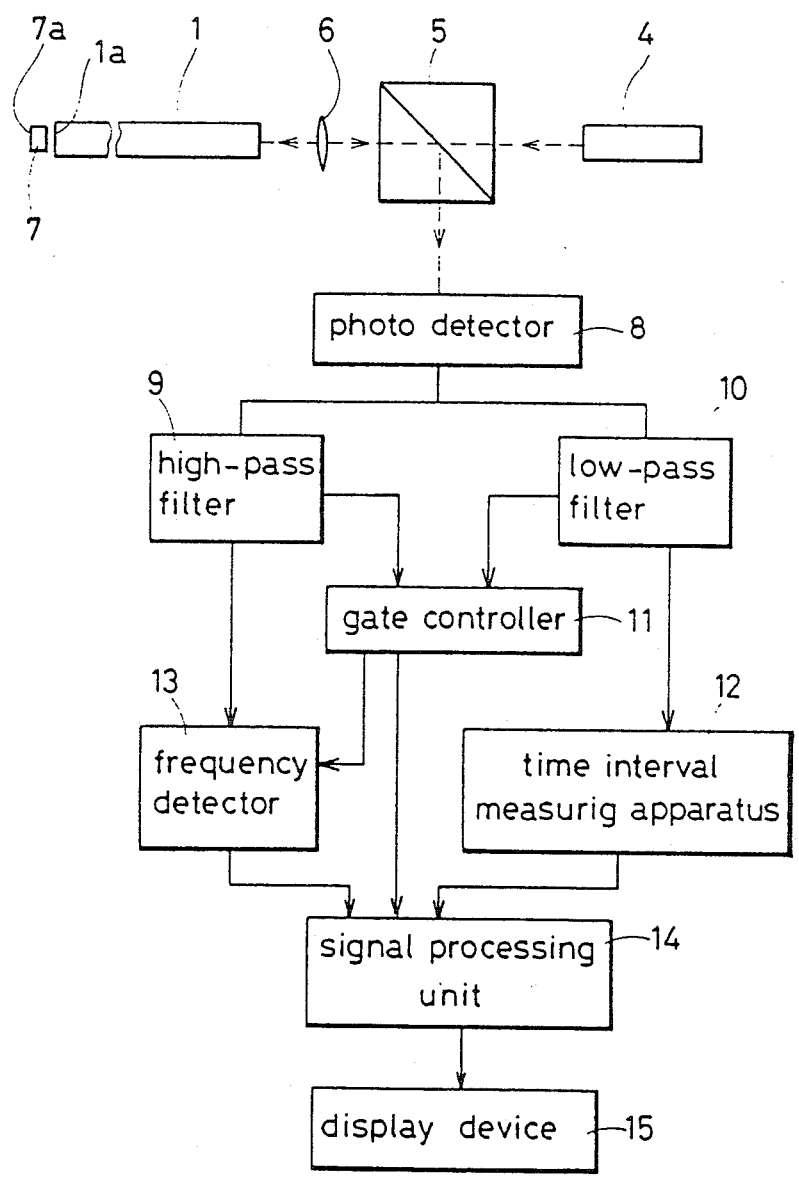
FIG. 3 is a block diagram of a circuit embodying the present invention.
Figure 4A:
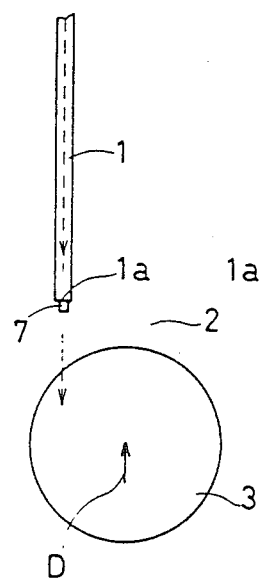
FIGS. 4(a) to 4(c) are schematic views showing another positional relations between another bubble and the optical fiber.
Figure 4B:
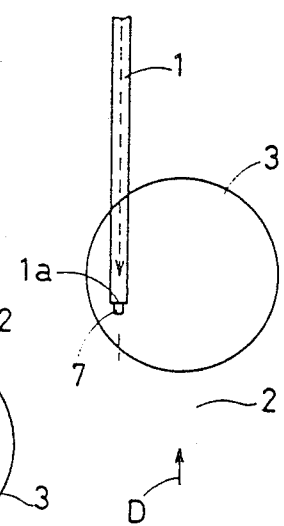
Figure 4C:
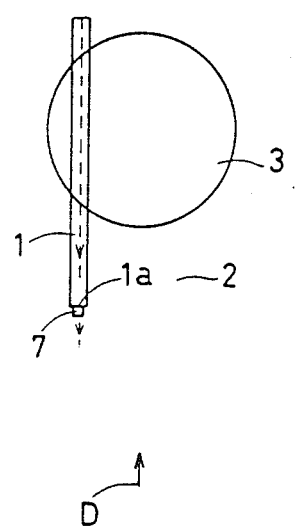
Figure 5:
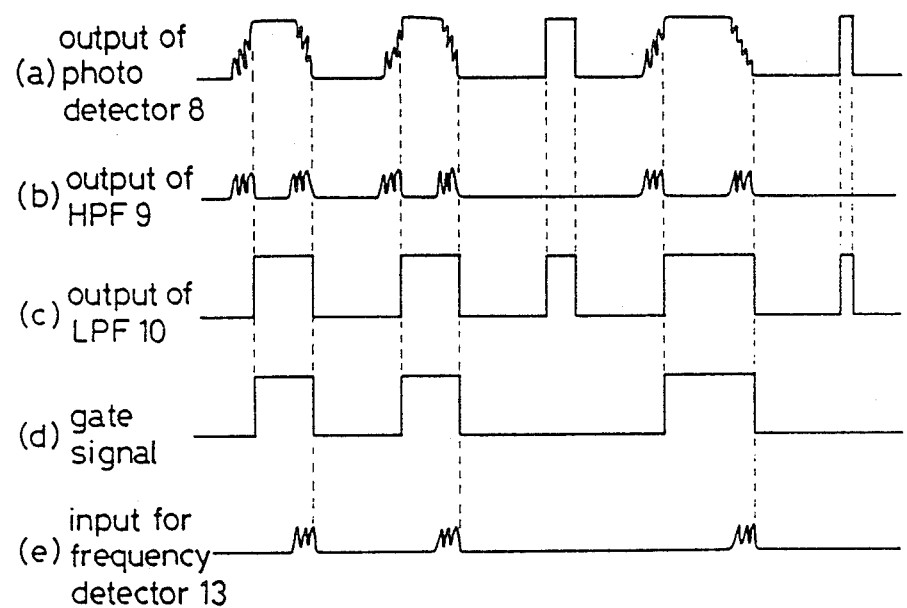
FIGS. 5(a) to 5(e) are graphs showing wave forms of the various points of the circuit in FIG. 3.

Next, the preferred embodiment of the present invention will be described below. FIG. 3 shows a block diagram of the embodiment. In this figure, the numeral 4 designates a laser oscillator having a single oscillation frequency. For example, the laser oscillator 4 is embodied by a He-Ne laser. The plane of polarization of the laser oscillator 4 is so preset at a specified direction, e.g. horizontal direction that the laser beam can pass through a polarization beam splitter 5. The laser light generated from the laser oscillator 4 passes through the polarization beam splitter 5 and is focussed on one of the end face of the optical fiber 1 by a lens 6. The optical fiber 1 is a multi-mode fiber, thereby the plane of polarization of the laser light becomes random during a few meters travelling in the optical fiber 1. The other end face 1a of the optical fiber 1 is placed in the liquid-gas two-phase flow, and the fiber is fixed so that the end face 1a perpendicularly confronts the two-phase flow path as shown in FIG. 1. A focussing lens 7 such as a selfoc lens or a sphere lens is preferably disposed at the end face 1a so as to focus the radiated light and improve the quality of signal. By such a structured optical system, a part of the laser light generated by laser oscillator 4 reflects at an end face 7a of the focussing lens 7, and the reflected light has a different light intensity whether the end face 7a is in contact with liquid or gas phase, and return to the optical fiber 1. In addition, if a bubble approaches toward the end face 7a, and the end face 7a penetrates the center of the bubble 3 as shown in FIGS. 1(a) to 1(c), then the radiated light is reflected at the bondary face of the two-phase flow and a part of the reflected light is put in the optical fiber 1 again through the focussing lens 7. But if the peripheral portion of the bubble 3 grazes the focussing lens 7 and the optical fiber 1 as shown in FIGS. 4(a) to 4(c), the radiated light is not reflect to the direction of the optical fiber 1. As a result of this, the Doppler shifted reflected light can be obtained less frequently than that the case of the light reflected by the end face 7a. The planes of polarization of these reflected light beams are random, and therefore a part of the reflected light beams (vertical plane component) is reflected at the polarization beam splitter 5 and fed to a photo detector 8. The photo detector 8 consists of, for example, an avalanche photo diode. It generates an electric signal having a voltage level corresponding to the light intensity of the reflected light from the end face 7a, as well as generates an electric signal having a Doppler frequency ($\Delta f_i$ at running into the gas phase or $\Delta f_o$ at running into the liquid phase) when the light reflected by the end face 7a and the light reflected by the two-phase flow are fed to the photo detector 8 simultaneously. FIG. 2(c) shows one example of the output signal of the photo detector 8. In this figure, the period from time $t_2$ to $t_4$ designates the transit time of the bubble 3, and the electric signal during the periods from $t_1$ to $t_2$, and from $t_3$ to $t_4$ include the Doppler shift frequencies $\Delta f_i$, and $\Delta f_o$, respectively. As already described, the Doppler shifted reflected light is not always obtained, but the intensity of the light reflected by the end face 7a changes with respect to the phase that the end face 7a contacts, in spite of any position of the bubble. Therefore, the output signal of the photo detector 8 in a long period is as shown in FIG. 5(a). The output signal of the photo detector 8 is fed to a high-pass fiter 9 and a low-pass filter 10, and is separated into data concerning the bubble transit time and the bubble velocity. The high-pass filter 9 feeds the high frequency Doppler shift signal ($\Delta f_i$, $\Delta f_o$) to a gate controller 11 as shown in FIG. 5(b). And the low-pass filter 10 feeds the low frequency square signal as shown in FIG. 5(c) corresponding to the reflected light from the end face 7a, to the gate controller 11 and a time interval measuring apparatus 12. When a Doppler shifted frequency ($\Delta fi$) is applied from the high-pass filter 9, the gate controller 11 generates gate signal having a time interval corresponding to the applied square wave from the low-pass filter 10 as shown in FIG. 5(d). The output signal of the high-pass filter 9 is applied to a frequency detector 13 only when the gate signal is "H" state as shown in FIG. 5(e). The frequency detector 13 detects the frequency of the applied signal and feeds data concerning the Doppler shift frequency $\Delta fo$ to a signal processing unit 14. The time interval measuring apparatus 12 include a well known counter for counting a clock pulse train, and detects time interval of the applied signal, and feeds the output data to the signal processing unit 14. The gate signal of the gate controller 11 is also fed to the signal processing unit 14. The signal processing unit 14 makes the time interval data effective only when the gate signal is applied, such as the time interval of $t_2$ to $t_4$ as shown in FIG. 2(a). And then the signal processing unit 14 obtains the velocity and the transit time of bubbles utilizing these data. In addition, the signal processing unit 14 obtains bubble diameters by multiplying the velocity and the transit time of the bubble, and a void fraction which is a cubic ratio of liquid and gas in the two-phase flow by signal processing. Such values are displayed by a display device 15. In this embodiment, the frequency detector 15 detects the Doppler shifted frequency $\Delta fo$, but the apparatus may be structured to detect the other Doppler shifted frequency $\Delta fi$, by inverting the gate signal of the gate controller 11. And furthermore, as seen from Equations (1) and (2), the ratio of the Doppler shift frequencies $\Delta fi$ to $\Delta fo$ is equal to that of the reflection indices of liquid phase to gas phase. Accordingly, if one of the reflection index of liquid or gas is known, the other reflection index can be obtained from the ratio of the Doppler shift frequencies.

In the abovementioned embodiment, we consider the situation that bubbles pass through the liquid phase, but the present invention can be naturally applied to other two-phase flows where drops pass in the gas phase, or where liquid and gas phase pass alternately. And the apparatus of the present invention is capable of measuring not only the bubble flow as mentioned in this embodiment, but also a slug flow, a froth flow, and an annular flow.

As described in detail above, the apparatus of the present invention is able to detect all kinds of liquid-gas two-phase flows in spite of the physical properties of liquid phase. And furthermore, it has a very high cubic resolution and can be measured every bubble from big to minute since the detecting part is the end face of the fine optical fiber. Accordingly, the apparatus has very high reliability and high accuracy.

What we claim is:

1. An apparatus for measuring liquid-gas two-phase flow comprising:
    a light source for generating light which has a signal oscillation frequency and a specified plane of polarization,
    a polarization beam splitter for passing the applied light from said light source,
    an optical fiber with two end faces, the light passing through said polarization beam splitter being applied to one of said end faces, and the other end face being placed in said liquid-gas two-phase flow,
    a photo detector for receiving reflected light by said polarization beam splitter out of the light reflected by said other end face of said optical fiber for measuring a bubble transit time and the light reflected by a boundary face of said liquid-gas two-phase flow for measuring doppler frequency shift,
    a velocity detecting means for detecting bubble velocity from a high frequency component of an output signal of said photo detector, and
    a transit time detecting means for detecting bubble transit time from a low frequency component of the output signal of said photo detector.

2. An apparatus for measuring liquid-gas two-phase flow in accordance with claim 1, wherein said light source is a laser oscillator.

3. An apparatus for measuring liquid-gas two-phase flow in accordance with claim 1, wherein said optical fiber has a focussing lens at said other end face thereof for focussing the radiating light of said light source and light reflected by said boundary face.

4. An apparatus for measuring liquid-gas two-phase flow in accordance with claim 3, wherein said focussing lens is a selfoc lens.

5. An apparatus for measuring liquid-gas two-phase flow in accordance with claim 1, wherein said other end face of said optical fiber is placed in a position perpendicular to said liquid-gas two-phase flow.

6. An apparatus for measuring liquid-gas two-phase flow in accordance with claim 1, wherein said apparatus further comprises a gate controller for generating a gate signal only when a high frequency component is applied from said photo detector, and said transit time detecting means detects the transit time arising from said gate signal.

7. An apparatus for measuring liquid-gas two-phase flow in accordance with claim 1, wherein said velocity detecting means detects velocity from the high frequency component of the reflected light which is generated when just before said other end face of said optical fiber contacts the gas phase.

8. An apparatus for measuring liquid-gas two-phase flow in accordance with claim 1, wherein said velocity detecting means detects velocity from the high frequency component of the reflected light which is generated when just before said other end face of said optical fiber contacts the liquid phase.

* * * * *